United States Patent
Galitsky

(10) Patent No.: US 10,402,411 B2
(45) Date of Patent: Sep. 3, 2019

(54) CONTENT INVERSION FOR USER SEARCHES AND PRODUCT RECOMMENDATIONS SYSTEMS AND METHODS

(71) Applicant: PAYPAL, INC., San Jose, CA (US)

(72) Inventor: Boris A. Galitsky, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 640 days.

(21) Appl. No.: 15/150,292

(22) Filed: May 9, 2016

(65) Prior Publication Data

US 2016/0253333 A1    Sep. 1, 2016

Related U.S. Application Data

(63) Continuation of application No. 13/957,830, filed on Aug. 2, 2013, now Pat. No. 9,336,297.

(60) Provisional application No. 61/678,893, filed on Aug. 2, 2012.

(51) Int. Cl.
| | |
|---|---|
| G06F 16/2457 | (2019.01) |
| G06F 16/33 | (2019.01) |
| G06F 16/248 | (2019.01) |
| G06F 16/951 | (2019.01) |
| G06F 17/27 | (2006.01) |

(52) U.S. Cl.
CPC ...... *G06F 16/24578* (2019.01); *G06F 16/248* (2019.01); *G06F 16/33* (2019.01); *G06F 16/3344* (2019.01); *G06F 16/951* (2019.01); *G06F 17/271* (2013.01)

(58) Field of Classification Search
CPC .............. G06F 17/3053; G06F 17/271; G06F 16/24578
See application file for complete search history.

(56) References Cited

U.S. PATENT DOCUMENTS

| | | |
|---|---|---|
| 7,027,974 B1 | 4/2006 | Busch et al. |
| 2002/0010574 A1 | 1/2002 | Tsourikov et al. |
| 2003/0182102 A1 | 9/2003 | Corston-Oliver et al. |
| 2004/0243568 A1 | 12/2004 | Wang et al. |
| 2006/0282414 A1* | 12/2006 | Sugihara ........... G06F 17/30654 |
| 2007/0022109 A1* | 1/2007 | Imielinski ......... G06F 17/30401 |
| 2008/0154883 A1* | 6/2008 | Chowdhury .......... G06F 3/0482 |
| 2009/0112892 A1 | 4/2009 | Cardie et al. |
| 2009/0187465 A1 | 7/2009 | Leggetter et al. |
| 2009/0193011 A1* | 7/2009 | Blair-Goldensohn ....................... G06F 17/30719 |
| 2009/0282019 A1* | 11/2009 | Galitsky ........... G06F 17/30634 |

(Continued)

*Primary Examiner* — Jensen Hu

(74) *Attorney, Agent, or Firm* — Haynes and Boone, LLP

(57) ABSTRACT

There is provided systems and method for content inversion for use in user searches and product recommendations. The methods include receiving a first content, wherein the first content includes a first sentence having at least one first sentiment expression, creating a syntactic parse tree of the first sentence, identifying a first sentiment in the at least one first sentiment expression, wherein the first sentiment corresponds to a first polarity, determining a first needs expression corresponding to the first sentiment, wherein the first needs expression includes a first subject. The method may further include creating a sub-tree corresponding to the first needs expression, and grouping the content with other content having similar sub-trees.

20 Claims, 7 Drawing Sheets

(56) References Cited

U.S. PATENT DOCUMENTS

| | | | |
|---|---|---|---|
| 2011/0060733 A1* | 3/2011 | Peng | G06F 17/30867 707/723 |
| 2011/0078167 A1* | 3/2011 | Sundaresan | G06F 17/2785 707/765 |
| 2011/0196875 A1* | 8/2011 | Vadlamani | G06F 17/30696 707/748 |
| 2011/0270607 A1 | 11/2011 | Zuev | |
| 2012/0072429 A1* | 3/2012 | Drissi | G06F 17/30864 707/748 |
| 2013/0091117 A1* | 4/2013 | Minh | G06F 17/30864 707/709 |

* cited by examiner

CONTENT INVERSION FOR USER SEARCHES AND PRODUCT RECOMMENDATIONS SYSTEMS AND METHODS

CROSS REFERENCE TO RELATED APPLICATIONS

This application is a continuation of U.S. patent application Ser. No. 13/957,830, filed Aug. 2, 2013, which claims priority to U.S. Provisional Patent Application No. 61/678,893 filed Aug. 2, 2012, all of which are incorporated by reference in their entirety.

BACKGROUND

Technical Field

The present application generally relates to content inversion for use in user searches and product recommendations and more specifically to linguistic processing of sentiment expressions and need expressions from syntactic parse trees to determine topics and features of semantic statements for use in natural language searching.

Related Art

User may conduct natural language searches using search engines that return results simply based on number and commonality of key words found in the search input. While often helpful, key word searches only perform term searches, and may return a multitude of irrelevant results or results that simply repeat key words frequently, but offer little content. Thus, the semantic understanding of phrases and sentences is not utilized. Additionally, it is becoming more common for users to visit blogs and forums prior to purchasing product in order to read user reviews. However, user reviews may be skewed towards opinions about subjects one user finds pertinent to their interests, while other users do not. For example, one purchaser of a camera may rate a product with five stars due to the durability and/or waterproof features of the camera. However, a second user may rate the camera with zero or one star due to the low tech features or minimal zoom of the camera. Depending on the interests and sentiments of those interests, reviews may only be relevant to certain new purchasers. Additionally, with no way to trust or rate the authors of reviews, their assigned rankings may not correspond to the new purchaser's rankings, i.e. be over or under valued. Thus, the new purchaser must wade through a multitude of reviews without finding relevant information.

BRIEF DESCRIPTION OF THE DRAWINGS

FIG. 2B-1 and FIG. 2B-2 are two syntactic parse trees of two different sentences showing common sub-trees having similar syntactic information;

Figure 1:
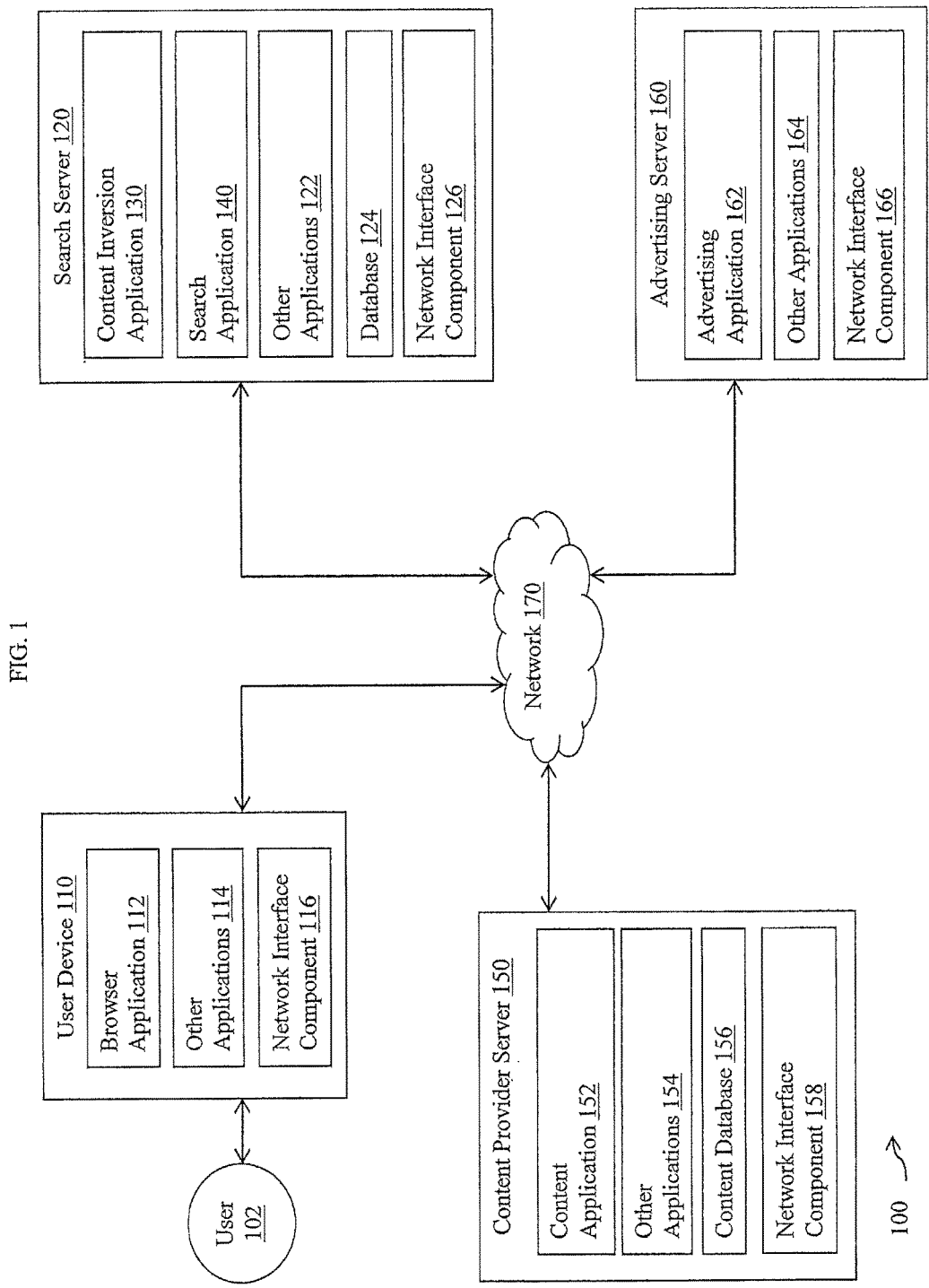
FIG. 1 is a block diagram of a networked system suitable for implementing the process described herein according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In certain embodiments, a content processing and/or search server processes various forms of content to obtain feature-centered information from author-centered structures. Content inversion may refer generally to the operation of taking author-centered structures and transforming them or "inverting" them into syntactic information for the purpose of understanding, analyzing, and correlating their semantic properties. The forms of content may include, but are not limited to, forum postings, online blog or other social media posting including micro-blogging, user reviews, or other media content. Once the content is received by the server, the content may be inverted from a semantic form into syntactic structures. In doing so, an application of the server may analyze the content to identify a sentence with a sentiment expression. The sentiment may be identified in the sentence, where the sentiment corresponds to a user feeling and/or expression concerning a specific subject. The sentiment corresponds to a particular polarity, such as good, great, bad, etc. Once the sentiment is identified, a user needs expression may be determined that is acted upon by the sentiment. The user needs expression may correspond to a particular statement of desire for the user. For example, the sentiment may be good, while the user need may be "food, travel, travel with children," or other need statement. The needs expression may have a particular subject acted on by the sentiment, and further have a feature that affects the needs expression. For example, where the needs expression is directed to travel or food, the feature may correspond to a type of food or travel location, such as Indian or Hawaii.

In some embodiments, prior to determining a sentiment of a sentence, syntactic parse trees representing the syntactic structure of a sentence may be formed for a plurality content sentences containing sentiment expression. Once a syntactic parse tree is formed, the above described method may be utilized to determine particular user sentiments to subjects and the subject's features. The subjects may be included in a user needs statement, and the user needs statement containing the subject and any additional features may form a sub-tree of the syntactic parse tree. Similar user sentiments, subjects, and/or features may then be correlated based on generalizing the sub-trees to find commonality. After sub-trees are grouped, topicality of the subjects is formed to organize the sentences.

In one embodiment, a plurality of contents containing sentences with consumer sentiment expressions are translated to syntactic parse trees, then sub-trees containing subjects are grouped by topicality of subject. The contents may include blog postings and user reviews. Then, a user may utilize a search engine to browse the contents by inputting a search query containing a subject and, in various embodiments, a feature. The search engine may retrieve results from the plurality of contents showing similar contents and features by searching the topic corresponding to the subject, and finding sub-trees expressing commonality with the search query. User sentiments in the search results may also have an effect on the results. For example, if the user searches for travel with beaches, the search engine may return contents where users expressed positive polarity sentiments about travel that included beaches. The user may initially designate both the subject and the feature, or may refine the subject with the feature while searching. Thus, the user is not required to sift through user reviews and/or blog postings that contain other sentiments, or use the words but do not express sentiments concerning the travel. Instead, the user is able to view reviews and blog postings that contain the subject with a user sentiment about the subject. Additionally, advertisements may be constructed using the user search, including sentiment expressions directed to the users search.

FIG. 1 is a block diagram of a networked system 100 suitable for implementing the process described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102 utilizing a user device 110 with a search server 120, a content provider server 150, and an advertisement server 160 over a network 170. User 102, such as a consumer, utilizes user device 110 to access search server 120 over network 170 and conduct searches of content to find information. Search server 120 may access content provided by content provider server 150 to deliver search results to user 102. Additionally, advertising server 160 may provide targets advertisements to user 102 in certain embodiments.

User device 110, search server 120, content provider server 130, and advertising server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented using any appropriate hardware and software configured for wired and/or wireless communication over network 160. For example, user device 110 may be implemented as a personal computer (PC), a smart phone, personal digital assistant (PDA), laptop computer, and/or other types of computing devices capable of transmitting and/or receiving data, such as an IPAD® from APPLES. Although a user device is shown, the user device may be managed or controlled by any suitable processing device. Although only one user device is shown, a plurality of user devices may be utilized.

User device 110 of FIG. 1 contains a browser application 112, other applications 114, and a network interface component 116. Browser application 112 and other applications 114 may correspond to processes, procedures, and/or applications executable by a hardware processor, for example, a software program. In other embodiments, user device 110 may include additional or different software as required.

Browser application 112 may be used, for example, to provide a convenient interface to permit a user to browse information available over network 170, for example, a graphical user interface (GUI) accessing a search server to conduct searches of content. In this respect, browser application 112 may conduct searches by accessing a website of a search engine. In other embodiments, browser application 112 may contain or correspond to an application accessing an external search engine, such as a toolbar application containing a search field utilizing a search engine, or a mobile phone application utilizing an external search engine.

Additionally, browser application 112 may be implemented as a web browser configured to view information and content available over the Internet or access a website of a content provider to provide content, such as user reviews, blog postings, micro-blog entries, and other user generated content. Browser application 112 may be utilized to access advertising websites and/or merchant websites and engage in online transactions. Additionally, browser application 112 may access other service provider websites and engage in financial transactions, messaging, social networking, and/or other online actions.

In various embodiments, user device 110 includes other applications 114 as may be desired in particular embodiments to provide desired features to user device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. Other applications 114 may contain software programs, such as a graphical user interface (GUI), executable by a processor that is configured to provide an interface to the user. In certain embodiments, other application 114 may contain application to access a content provider and submit, view, and/or review content, such as blogging, micro-blogging, and social networking applications.

In various embodiments, user device 110 includes at least one network interface component (NIC) 116 adapted to communicate with network 170 including search server 120, content provider server 150, and/or advertising server 160. In various embodiments, network interface component 116 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Search server 120 may be maintained, for example, by a search engine provider and/or content aggregator offering a service for user 102. In various embodiments, search server 120 corresponds generally to a server for providing a search engine including content aggregation and analysis. Search server 120 may correspond to an online search engine or may correspond to a more local database search engine, including offline database search engines. Thus, search server 120 may be connected to user device 110 and/or content providers including content databases directly in various embodiments and provide an informational retrieval system. Search server 120 may further include processing applications, which may be configured to interact with content accessible to search server 120. For example, search server 120 may access content and perform content inversion as will be discussed herein. In one example, search server 120 may be provided by Stubhub®, Inc. of San Francisco, Calif., Ebay®, Inc. of San Jose, Calif., USA, and/or PayPal®, Inc. of San Jose, Calif. However, search server 120 may correspond generally to any search provider offering inverted content search services utilized by user 102.

Search server 120 includes a content inversion application 130, a search application 140, other applications 122, a database 124, and a network interface component 126. Content inversion application 130, search application 140, and other applications 122 may correspond to processes, procedures, and/or applications executable by a hardware processor, for example, a software program. In other embodiments, search server 120 may include additional or different software as required.

Service provider server 120 includes content inversion application 130, which may be configured to interact with user device 110, content provider server 150, and/or advertising server 160 over network 170. Content inversion application 130 may enable search server 120 to find and access content and invert received content. As previously discussed, content inversion refers to taking a semantic structure, such as a sentence, and inverting, or determining, syntactic information. Thus, content inversion application 130 may include processes to access databases and/or crawl the web in order to find content having sentences including sentiment expressions. Content inversion application 130 may also receive content, including receiving search queries. Content inversion application 130 may generally access all or any kind of content. However, in other embodiments, content inversion application 130 may search and find only specific types of content, or content in specific locations. This limit of type and/or place may be set by an administrator of search server 120 or user 102 when accessing search server 120 to perform a search.

Content inversion application 130 contains further applications for the processing of found and accessed content. Content inversion application may create syntactic parse trees of sentences of content. Once a syntactic parse tree has been created, content inversion application 130 may identify statements of sentiment in the sentence using the syntactic parse tree by identifying sentiment words and the associated statement. In addition to identifying a sentiment expression in a semantic structure, content inversion application may identify needs expression corresponding to the sentiment. In some embodiments, such as search queries, only a needs statement has to be identified. The needs statement includes a sub-tree of the syntactic parse tree. The needs expression may be normalized in order to transform the needs expressions into sequences of words in a normal format without prepositions and articles, such as a subject of the needs expression. Thus, the subject of the needs expression is determined and any additional feature(s) are further determined. The features may correspond to subcategory or further clarifier of the subject. Additionally, content inversion application 130 may group the needs expressions by the main noun of the needs expression, i.e. the subject, to create topics, and further into sub-categories by features. Once the content is inverted to topicality groups, the content and/or content identifiers (i.e. content links or other identifying information) may be stored according to topicality groups in a database. Additionally, sentiment may affect storage, ranking within topic, or search result relevancy.

Search server 120 further includes search application 140. Search application 140 may correspond generally to processes including a search engine for browsing databases or crawling the web. Search application 140 may work in conjunction with content inversion application 130 to perform searches of inverted content and content inversion application 130 inverts content, or search application 140 may search a database of already inverted content. Search application 140 may correspond to an application including a displayable GUI for user 102 to access with user device 110, or may correspond to processes accessed and run by an application on user device 110, for example a search or toolbar application running on user device 110.

In various embodiments, search server 120 includes other applications 122 as may be desired in particular embodiments to provide desired features for search server 120. For example, other applications 122 may include security applications for implementing server-side security features, programmatic server applications for interfacing with appropriate application programming interfaces (APIs) over network 170, or other types of applications. Other applications 122 may contain software programs, such as a graphical user interface (GUI), executable by a processor that is configured to provide an interface to the user.

Service provider server 120 includes database 124 having stored data and accessible by content inversion application 130 and/or search application 140. Database 124 may include results from content inversion application 130, including original content, identifiers to the original content, sentences from the original content, and sentence syntactic parse trees, identified sentiment expressions, identified sentiments, user needs expressions, normalized user needs expressions, subjects, features, and normalized user needs expressions, subjects, and/or features organized by topicality.

In various embodiments, search server 120 includes at least one network interface component (NIC) 126 adapted to communicate with network 170 including user device 110, content provider server 150, and/or marketing server 160. In various embodiments, network interface component 126 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Content provider server 150 may be maintained, for example, by an online content service provider, which may provide content, content creation, and/or content processing applications to user 102. In this regard, content provider server 150 includes one or more processing applications which may be configured to interact with user device 110 over network 170 to facilitate the creation and/or processing of content. Content provider server 150 may provide content services, such as blogging and/or micro-blogging services, including social networking services. Content provider server 150 may also provide user 102 with user reviews and/or ratings of goods and/or services. In this regard, content provider server 150 may be provided by Stubhub®, Inc. of San Francisco, Calif., Ebay®, Inc. of San Jose, Calif., USA, and/or PayPal®, Inc. of San Jose, Calif., USA, for example. However, in other embodiments, content provider server 150 may be maintained by any entity wishing to provide content creation and processing services to user 102.

Content provider server 150 of FIG. 1 includes a content application 152, other applications 154, database 156, and a network interface component 158. Content application 152 and other applications 154 may correspond to processes, procedures, and/or applications executable by a hardware processor, for example, a software program. In other embodiments, content provider server 150 may include additional or different software as required.

Content provider server 150 includes content application 152 providing a convenient interface to user 102 for the creation and/or processing of content. Content application 152 may provide an interface for user 102 and/or other users to upload, create, update, or otherwise process content available for other users. Content application 152 may provide blogging and/or micro-blogging services, including services with social networking services. Content application 152 may additionally be included with or in addition to other applications and allow users to submit other content, including user generated content. In some embodiments, content application 152 may enable users to post reviews of products, including rating services.

Content provider server 150 includes other applications 154 as may be desired in particular embodiments to provide desired features to content provider server 150. For example, other applications 154 may include security applications for implementing server-side security features, programmatic server applications for interfacing with appropriate application programming interfaces (APIs) over network 170, or other types of applications. Other applications 154 may contain software programs, such as a graphical user interface (GUI), executable by a processor that is configured to provide an interface to a user.

Content provider server 150 includes content database 156 including content data and information. Content database 156 may include created and/or uploaded content stored to content provider server 150. Content database 156 may further include archived content, retrieved content from other content providers, and/or identifiers of other content. For example, content database 156 may include user generated content, including blog posts, videos, user reviews, or other user generated content. Additionally, content database 156 may include links or other identification information to photographs, videos, or other online content from the blog post and/or user review.

In various embodiments, content provider server 150 includes at least one network interface component (NIC) 158 adapted to communicate with network 170 including user device 110, search server 120, and/or advertising server 160. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Advertising server 160 may be maintained, for example, by an advertising or marketing entity, which may provide advertising opportunities to vendors by performing targeted advertising with sentiment statements to facilitate the sale of goods and/or services to user 102. In this regard, advertising server 160 may including one or more advertising applications to collect user needs expressions of user 102 when searching, and provide an advertisement having a sentiment, matching subject, and feature if necessary. While advertising server 160 is shown separate from search server 120 and content provider server 150, it is understood the services provided by advertising server 160 may be incorporated within one or both of search server 120 and/or content provider server 150.

Advertising server 160 includes an advertising application 162, other applications 164, and a network interface component 166. Advertising application 162 may correspond to processes, procedures, and/or applications executable by a hardware processor, for example, a software program. In other embodiments, advertising server 160 may include additional or different software as required.

Advertising server 160 includes advertising application 162, which may provide advertising and/or marketing opportunities to vendors based on submitted user needs expressions. Search server 120, content provider server 150, or other server, such as a vendor, may desire to transmit advertisements, coupons, sale offers, or other marketing strategy to user based on user searches. Advertising application 162 may therefore transmit targeted advertising to the users based on the user needs expression in the user's search, such as coupons to stores local to the search, sale offers based on specific subjects in the search, and/or other marketing strategy specific to the user's search. Additionally, advertising application 162 may utilize information in database 124 of search server 120 to provide sentiment statements matching needs expressions that occur frequently or with positive polarity.

In various embodiments, advertising server 160 includes other applications 164 as may be desired in particular embodiments to provide desired features for advertising server 160. For example, other applications 164 may include security applications for implementing server-side security features, programmatic server applications for interfacing with appropriate application programming interfaces (APIs) over network 170, or other types of applications. Other applications 164 may contain software programs, such as a graphical user interface (GUI), executable by a processor that is configured to provide an interface to the user.

In various embodiments, advertising server 160 includes at least one network interface component (NIC) 166 adapted to communicate with network 170 including user device 110, search server 120, and/or content provider server 150. In various embodiments, network interface component 166 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2A:
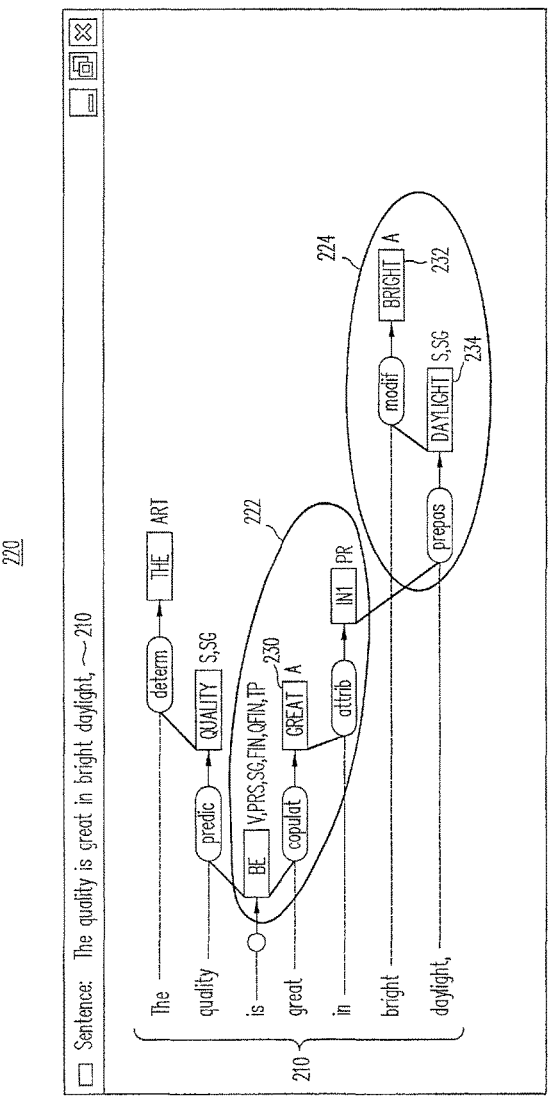
FIG. 2A is a syntactic parse tree of a sentence showing syntactic information from a semantic structure.

FIG. 2A is a syntactic parse tree of a sentence showing syntactic information from a semantic structure. According to FIG. 2A, a sentence is shown having a sentiment expression and a needs expression. The sentence may correspond to a sentence found in content. As previously discussed, the content may correspond to blog and/or micro-blog posts, social media posts, user reviews, forums postings, or other available content including online and offline content. The content may include content having user sentiment statements corresponding to a particular user needs expression.

Sentence 210 of FIG. 2A is shown after processing into syntactic parse tree 220. Syntactic parse tree 220 is a parse tree having an ordering that shows the syntactic structure of sentence 210. Syntactic parse tree 220 takes the semantic structure of sentence 210 and converts the semantic structure into syntactic information, i.e. separated into syntactic properties or units, for analysis. The syntactic information can be analyzed to determine the semantic differences between sentences that contain similar words.

For example, sentence 210 of FIG. 2A states, "The quality is great in bright daylight." In this example, sentence 210 refers to the picture taking quality of a camera. However, in normal natural language searches, a user may search for, "great quality in bright daylight" when looking for quality of picture taking. Sentence 210 may be returned in a search result with relevance the same as a sentence that states, "The camera casing quality looks great in bright daylight," using such search terms.

Thus, in FIG. 2A, sentence 210 is converted to syntactic parse tree 220 having sentiment expression 222 and needs expression 224. Sentiment expression 222 circled in FIG. 2A is shown with sentiment 230. A content inversion application may identify sentiment 230 from sentiment expression 222. Sentiment 230 may correspond to a user statement of feeling or expression containing a polarity, such as good, great, bad, worse, etc. As shown in FIG. 2A, sentiment 230 corresponds to great.

Next, a content inversion application may determine the needs expression corresponding to sentiment 230. In FIG. 2A, needs expression 224 corresponds to sentiment 230. Needs expression 224 corresponds to a user concern affected by the sentiment, or is a sub-tree of syntactic parse tree 220 dependent on sentiment 230. Needs expression 224 includes phrasings of nouns, adjectives, and/or verbs that correspond to an expression of need by a user, such as a desire or want the user possesses. In search queries, a sentiment expression may not occur, thus only a needs expression may be determined. However, as the search result is concerned only with matching and similar needs expressions using sub-trees, sentiment expression in results may affect result rankings, placement, or other user or administrator chosen feature.

Needs expression 224 may be normalized after it is determined Normalizing needs expression 224 may remove excess words, such as prepositions and articles, to identify the subject and any feature affecting the subject. Thus, after normalizing needs expression 224, subject 232 and feature 234 may be identified. In addition to normalizing needs expression 224 to remove extraneous words, subject 232 and feature 234 may be filtered to remove the trivial and very rare subjects and/or features.

Figures 1, 2B:
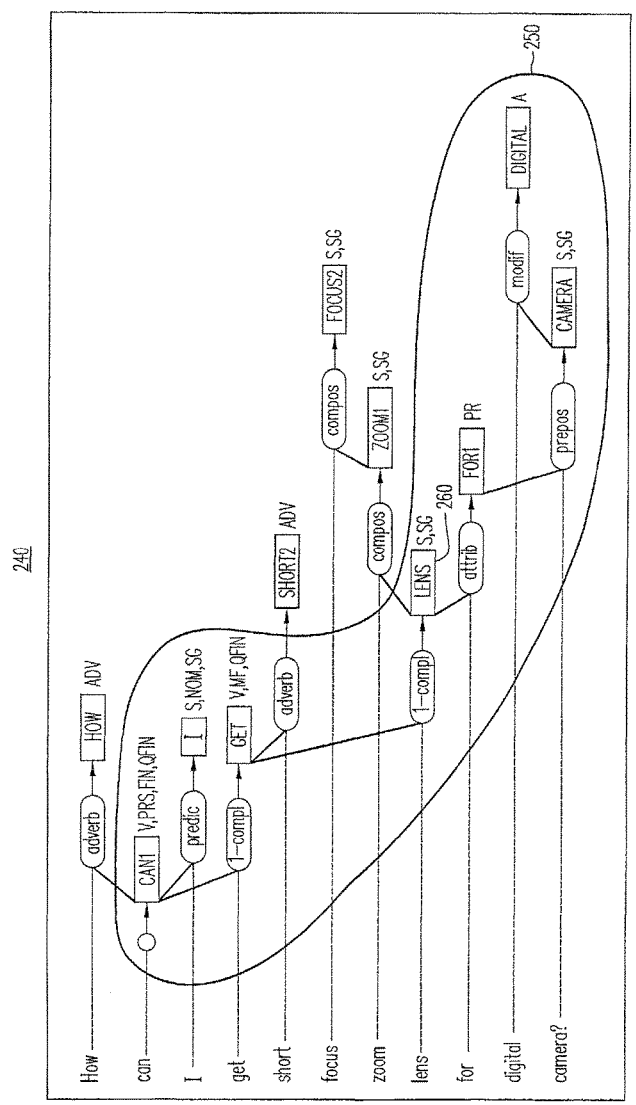
Figures 2, 2B:
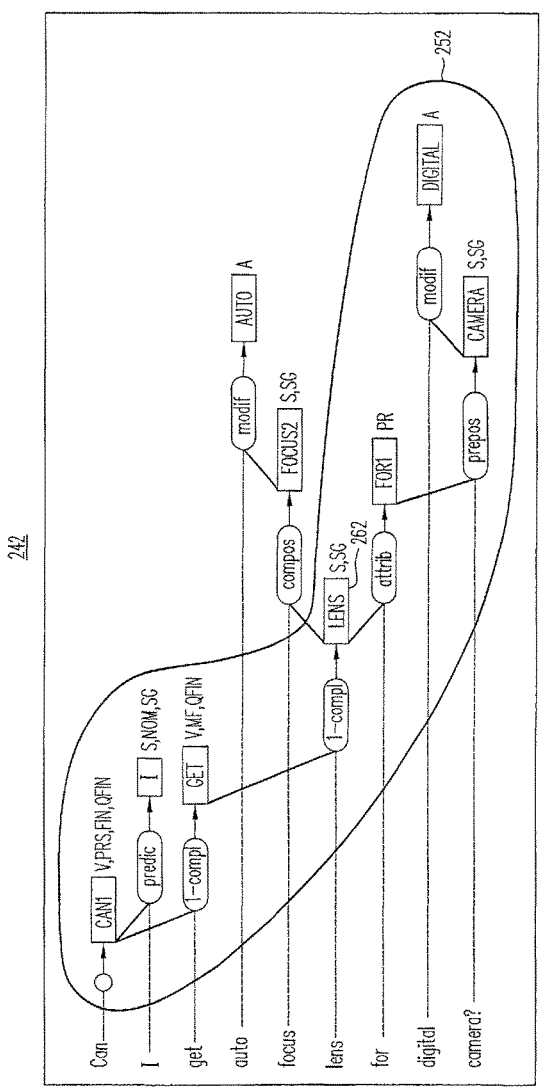

The content inversion application may group needs expressions having subjects and/or features by topicality, i.e. form categories and/or subcategories of concerns or needs. Thus, FIG. 2B-1 and FIG. 2B-2 are two syntactic parse trees of two different sentences showing common sub-trees having similar syntactic information. FIG. 2B-1 and FIG. 2B-2 are syntactic parse trees of two different sentences. However, the sub-trees of the syntactic parse trees having the same subject show similar sub-trees. Thus, when a search using a similar needs expression is submitted, FIG. 2B-1 and FIG. 2B-2 may be retrieved if commonality exists between sub-trees of the search and FIG. 2B-1 and FIG. 2B-2.

FIG. 2B-1 displays syntactic parse tree 240 including a subject 260 and a sub-tree 250. While syntactic parse tree 240 is shown as a parse tree of a question or search query with no sentiment, it is understood syntactic parse tree 240 is shown by way of example to display commonality between sub-trees of differing syntactic parse trees.

Syntactic parse tree 240 is formed for the sentence, "How can I get short focus zoom lens for digital camera." Syntactic parse tree 240 may be formed by a content inversion application. Syntactic parse tree 240 contains subject 260 which may be determined and correlated to other same or similar subjects, called topicality grouping. Syntactic parse tree 240 further contains sub-tree 250, which corresponds generally to a user needs statement having further information, including features affecting subject 250.

FIG. 2B-2 displays syntactic parse tree 242 including a subject 262 and a sub-tree 252. Syntactic parse tree 242 is formed for the sentence, "Can I get auto focus lens for digital camera." Similar to FIG. 2B-1, syntactic parse tree 242 may be formed by a content inversion application. Syntactic parse tree 242 contains subject 262 which may be determined and correlated to other same or similar subjects, described as topicality grouping above. Syntactic parse tree 242 further contains sub-tree 252, which corresponds generally to a user needs statement having further information, including features affecting subject 252.

Commonality between sub-tree 250 and sub-tree 252 can be determined by generalizing expressions between syntactic parse tree 240 and syntactic parse tree 242. At the phrase level, generalization starts with finding alignment between two phrases, thus attempting to set correspondences between as many words as possible in the two phrases. The alignment should retain the integrity of the phrase. In particular, two phrases should only be aligned if their head nouns (subjects) are established.

For a pair of phrases, generalization includes all maximum ordered sequences of words forming generalization nodes for words in phrases so that the order of words is retained. In the following example: "To buy digital camera today, on Monday" and "Digital camera was a good buy today, first Monday of the month," generalization is {<JJ-digital, NN-camera>, <NN-today, ADV,Monday>}, where the generalization for noun phrases is followed by the generalization by adverbial phrase. Verb buy is excluded from both generalizations because it occurs in a different order in the above phrases. Buy-digital-camera is not a generalization phrase because buy occurs in different sequence with the other generalization nodes. For a pair of sentences, their generalization is a set of maximum common subgraphs (sub-trees) of their syntactic parse trees, or, in terms of phrases, set of all generalization of all phrases from these sentences.

Multiple maximum generalizations occur depending how correspondence between words is established, multiple generalizations are possible. To obey the condition of maximum, generalizations are scored. Scoring weights of generalizations are decreasing in following order: nouns and verbs, other parts of speech, and nodes with no lemma but part of speech only.

To optimize the calculation of generalization score, the POS weights are introduced to deliver the most accurate similarity measure between sentences possible. $W_{NN}=1.0$, $W_{JJ}=0.32$, $W_{RB}=0.71$, $W_{CD}=0.64$, $W_{VB}=0.83$, $W_{PRP}=0.35$ excluding common frequent verbs like get/take/set/put for which $W_{VBcommon}=0.57$. Also $W_{<POS,*>}=0.2$ (different words but the same POS), and $W_{<*,word>}=0.3$ (the same word but occurs as different POSs in two sentences).

Generalization score (or similarity between sentences $sent_1$, $sent_2$) then can be expressed as sum through phrases of the weighted sum through words $word_{sent1}$ and $word_{sent2}$.

$$\text{score}(\text{sent}_1, \text{sent}_2) = \Sigma_{\{NP, VP, \ldots\}} \Sigma_{POS} \text{word\_generalization}(\text{word}_{\text{sent1}} \text{word}_{\text{sent2}}).$$

Maximal generalization can then be defined as the one with the highest score. This way is defined a generalization for phrases, sentences and paragraphs. Result of generalization can be further generalized with other parse trees or generalization. Below is an example of generalization between two sentences. Intermediate sub-trees are shown as lists for brevity. Generalization of distinct values is denoted by '*'. Consider the three following sentences:

I am curious how to use the digital zoom of this camera for filming insects.

How can I get short focus zoom lens for digital camera?

Can I get auto focus lens for digital camera?

One can see that the second and third trees are rather similar, so it is straight-forward to build their common sub-tree as an (interrupted) path of the tree. {MD-can, PRP-I, VB-get, NN-focus, NN-lens, IN-for JJ-digital NN-camera}.

At the phrase level: Noun phrases: [[NN-focus NN-*], [JJ-digital NN-camera]] Verb phrases: [[VB-get NN-focus NN-*NN-lens IN-for JJ-digital NN-camera]].

One can see that common words remain in the maximum common sub-tree, except 'can' which is unique for the second sentence, and modifiers for 'lens' which are different in these two sentences (shown as NN-focus NN-*NN-lens). When sentences are not as similar as sentences 2 and 3, and their generalization proceeds on a phrase-by-phrase basis. Below is the syntactic parse tree via chunking using the format <position (POS-phrase)>.

Parse 1 0(S-I am curious how to use the digital zoom of this camera for filming insects), 0(NP-I), 2(VP-am curious how to use the digital zoom of this camera for filming insects), 2(VBP-am), 5(ADJP-curious), 5(JJ-curious), 13(SBAR-how to use the digital zoom of this camera for filming insects), 13(WHADVP-how), 13(WRB-how), 17(S-to use the digital zoom of this camera for filming insects), 17(VP-to use the digital zoom of this camera for filming insects), 17(TO-to), 20(VP-use the digital zoom of this camera for filming insects), 20(VB-use), 24(NP-the digital zoom of this camera), 24(NP-the digital zoom), 24(DT-the), 28(JJ-digital), 36(NN-zoom), 41(PP-of this camera), 41(IN-of), 44(NP-this camera), 44(DT-this), 49(NN-camera), 56(PP-for filming insects), 56(IN-for), 60(NP-filming insects), 60(VBG-filming), 68(NNS-insects).

Parse 2 [0(SBARQ-How can I get short focus zoom lens for digital camera), 0(WHADVP-How), 0(WRB-How), 4(SQ-can I get short focus zoom lens for digital camera), 4(MD-can), 8(NP-I), 8(PRP-I), 10(VP-get short focus zoom lens for digital camera), 10(VB-get), 14(NP-short focus zoom lens), 14(JJ-short), 20(NN-focus), 26(NN-zoom), 31(NN-lens), 36(PP-for digital camera), 36(IN-for), 40(NP-digital camera), 40(JJ-digital), 48(NN-camera)].

Now we group the above phrases by the phrase type [NP, VP, PP, ADJP, WHADVP. Numbers encode character position at the beginning. Each group contains the phrases of the same type, since the match occurs between the same type.

Grouped phrases 1 [[NP [DT-the JJ-digital NN-zoom IN-of DT-this NN-camera], NP [DT-the JJ-digital NN-zoom], NP [DT-this NN-camera], NP [VBG-filming NNS-insects]], [VP [VBP-am ADJP-curious WHADVP-how TO-to VB-use DT-the JJ-digital NN-zoom IN-of DT-this NN-camera IN-for VBG-filming NNS-insects], VP [TO-to VB-use DT-the JJ-digital NN-zoom IN-of DT-this NN-camera IN-for VBG-filming NNS-insects], VP [VB-use. DT-the JJ-digital NN-zoom IN-of DT-this NN-camera IN-for VBG-filming NNS-insects]], [ ], [PP [IN-of DT-this NN-camera], PP [IN-for VBG-filming NNS-insects]], [ ], [ ], [ ]].

Grouped phrases 2 [[NP [JJ-short NN-focus NN-zoom NN-lens], NP [JJ-digital NN-camera]], [VP [VB-get JJ-short NN-focus NN-zoom NN-lens IN-for JJ-digital NN-camera]], [ ], [PP [IN-for JJ-digital NN-camera]], [ ], [ ], [SBARQ [WHADVP-How MD-can NP-I VB-get JJ-short NN-focus NN-zoom NN-lens IN-for JJ-digital NN-camera], SQ [MD-can NP-I VB-get JJ-short NN-focus NN-zoom NN-lens IN-for JJ-digital NN-camera]]].

In this manner, the level of generalization may be determined between sub-trees. Thus, search results containing sub-trees with corresponding levels of generalization may be returned, instead of simple occurrence of search terms.

Figure 3:
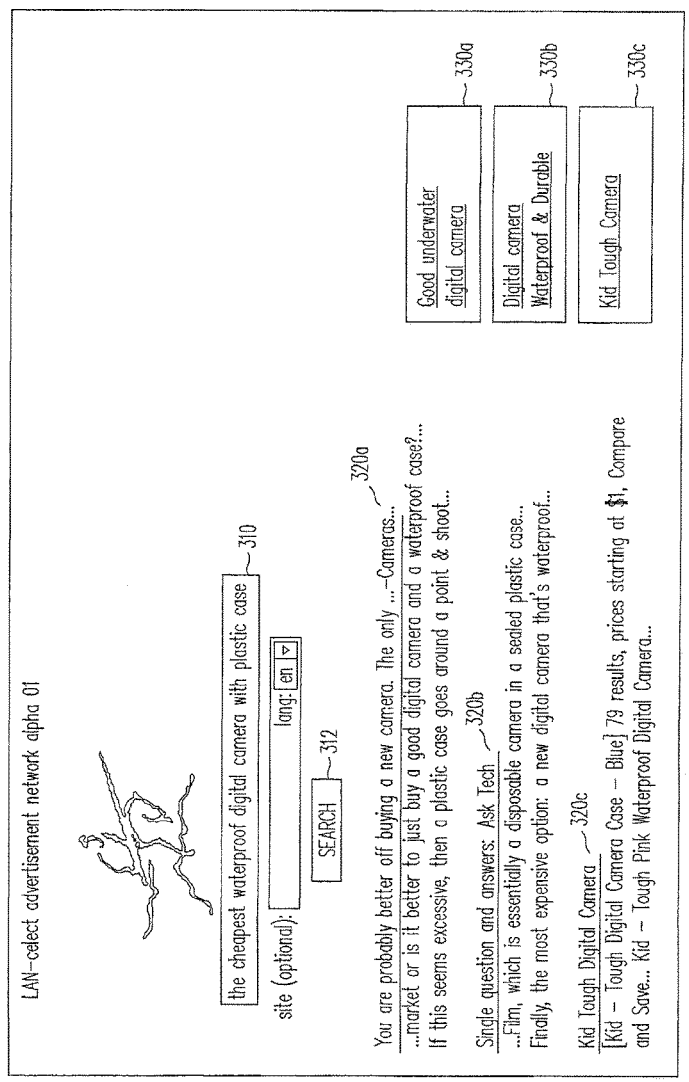
FIG. 3 is an exemplary user interface showing search results and product recommendations using determined syntactic information.

FIG. 3 is an exemplary user interface showing search results and product recommendations using determined syntactic information. FIG. 3 shows results using a search engine that searches using syntactic information. Thus, FIG. 3 shows the results of a process that matches the syntactic parse sub-tree of a search query to syntactic parse sub-trees of contents having the same or similar subjects to the search query.

FIG. 3 shows a user submitted search query 310 in search engine 312. The search query 310 contains text of a user needs statement. The user needs statement corresponds generally to, "Cheapest waterproof digital camera with plastic case." The user needs statement contains the general subject of cameras. Additionally, the user needs statement contains additional features, including digital, waterproof, cheap/cheapest, and plastic case. Once user has submitted the user needs statement containing a subject and features to search engine 312, search engine may create a user syntactic parse tree of search query 310. Search engine 312 may perform a search by generalizing the user syntactic parse tree to sub-trees of content that has been inverted. Thus, search results are populated.

As shown in FIG. 3, search results contain forum results 320a and 320b and user reviews 320c. Forum results 320a and 320b display forum searched results using the methods described herein. For example, forum results 320a and 320b contain sentences with syntactic parse trees having generalized sub-trees to search query 310. Additionally, user reviews 320c also contain sentences with syntactic parse trees having generalized sub-trees to search query 310. 320a-320c may be grouped by sentiments contained in sentiment expressions found in the syntactic parse trees, by ranking the sentiments based on polarity of number of polarity values, or other sentiment grouping.

Moreover, search engine 312 may contain or work with an advertising application to present advertisements 330a-330c. Advertisements 330a-330c may be built by the advertising application including subjects and features taken from search query 310. Moreover, advertisements 330a-330c may be described using "advertising language" including sentiment expressions, such as positive sentiments.

Figure 4:
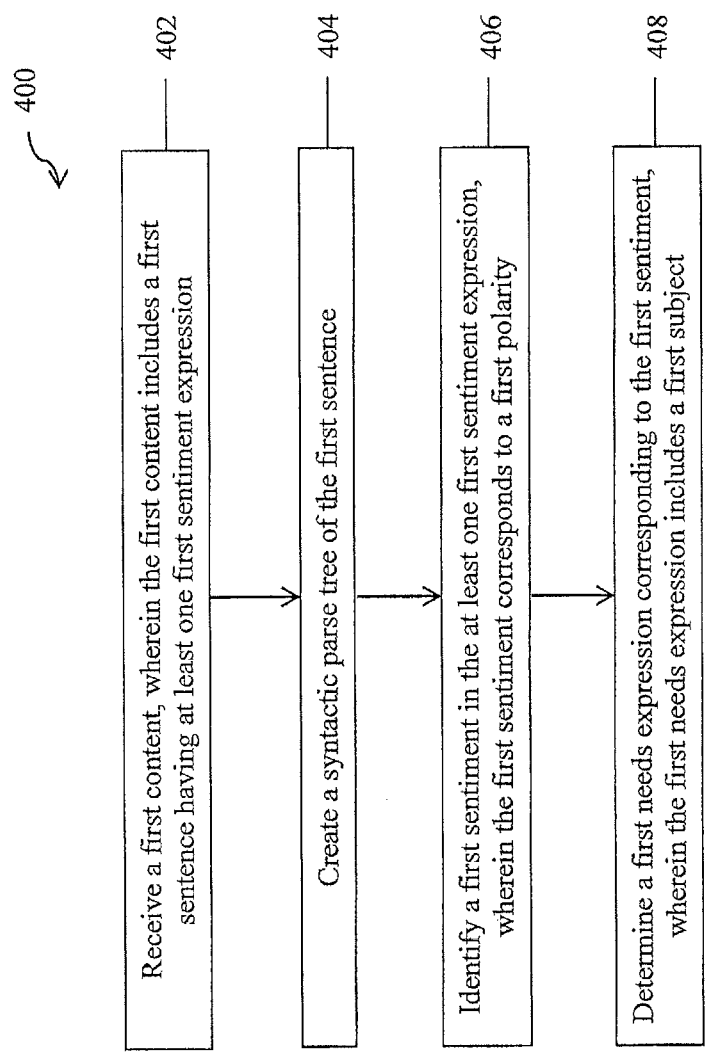
FIG. 4 is a flowchart of an exemplary process by a server for inverting a content having a semantic structure into syntactic information.

FIG. 4 is a flowchart of an exemplary process by a server for inverting a content having a semantic structure into syntactic information. Note that one or more steps, processes, and methods described herein may be omitted, performed in a different sequence, or combined as desired or appropriate.

At step 402, a server, such as search server 120 receives a first content, wherein the first content includes a first sentence having at least one first sentiment expression. The first content may correspond to a blog posting, micro-blog posting, user review, or other content, such as those previously discussed. The content contains some general statement of sentiment, such as a statement of the users feeling, sentiment, and/or expression about a user need statement.

Once a sentence with a sentiment expression is received, the server creates a syntactic parse tree of the first sentence at step 404. As previously discussed, the syntactic parse tree corresponds generally to a parse tree having an ordering that shows the syntactic structure of sentence, for example syntactic parse tree 220 of sentence 210.

At step 406, a content inversion application of the server identifies a first sentiment in the at least one first sentiment expression, wherein the first sentiment corresponds to a polarity expression. The content inversion application may identify the sentiment in the sentiment expression by removing extraneous wording. Additionally, the sentiment may be determined to correspond to a polarity expression, such as positive, negative, or neutral polarity.

Once the sentiment is determined, a first needs expression correspond to the first sentiment is determined, wherein the first needs expression includes a first subject at step 408. The first needs expression may correspond to a sub-tree of the syntactic parse tree. The first needs expression corresponds to a user interest, need, or desire, such as a subject corresponding to the sentiment.

Figure 5:
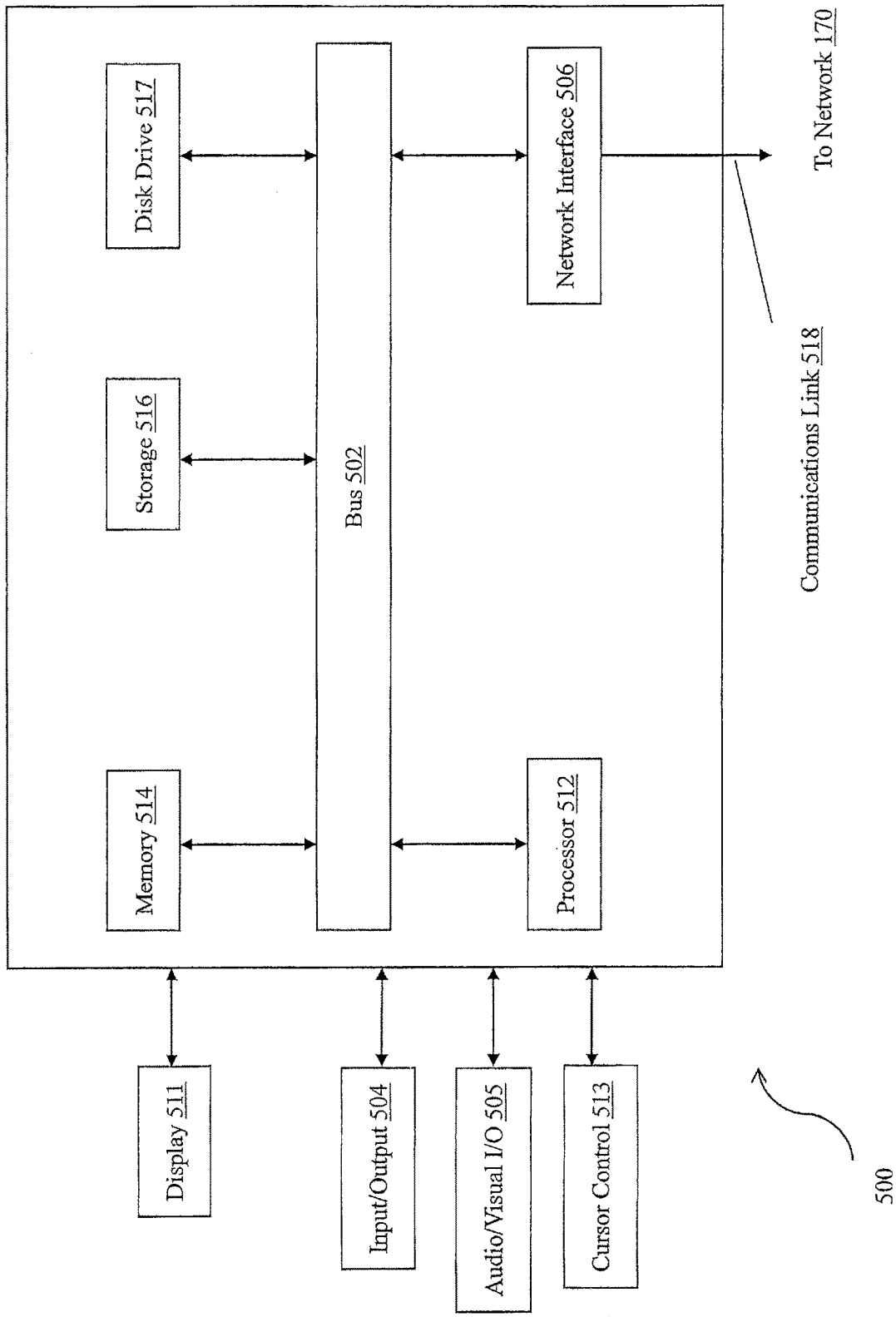
FIG. 5 is a block diagram of a computer system suitable for implementing one or more components in FIG. 1 according to one embodiment.

FIG. 5 is a block diagram of a computer system 500 suitable for implementing one or more embodiments of the present disclosure. In various embodiments, the user device may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant server, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
receiving a search query;
determining a user syntactic parse tree for the search query, wherein the user syntactic parse tree comprises units of at least one word generated from the search query based on syntactic properties of the units;
determining a first sentiment in the search query based on the user syntactic parse tree and the syntactic properties of the units;
determining, based on the first sentiment and the syntactic properties of the units, a user needs expression affected by the first sentiment in the search query;
determining a first subject of the search query based on the user needs expression;
executing, using a search engine, an online search using at least the first subject and the first sentiment from the user syntactic parse tree;
receiving content resulting from the online search using the search engine;
determining at least one sentence from the content comprising for at least one second subject and at least one second sentiment;
matching the first subject to the at least one second subject and the first sentiment to the at least one second sentiment;
aligning phrases between the search query and the at least one sentence based on the matching the first subject to the at least one second subject and the first sentiment to the at least one second sentiment;
determining a generalization score between the search query and the at least one sentence using the phrases aligned between the search query and the at least one sentence; and
providing search results based on the generalization score and the content.

2. A method comprising:
receiving a search query;
converting the search query to first syntactic information comprising a user syntactic parse tree for the search query, wherein the user syntactic parse tree comprises units of at least one word generated from the search query based on syntactic properties of the units;
determining a sentiment in the search query based on the user syntactic parse tree and the syntactic properties of the units;
determining, based on the sentiment and the syntactic properties of the units, a user needs expression affected by the sentiment in the search query;
determining a subject of the search query based on the user needs expression;
determining search results through an online search engine server using the subject and the sentiment in the first syntactic information;
generating second syntactic information based on the search results;
determining a similarity between the first syntactic information and the second syntactic information; and
providing the search results to the search query based on the similarity between the first syntactic information and the second syntactic information.

3. The method of claim 1, further comprising:
communicating the first subject to an advertisement entity; and
receiving an advertisement from the advertisement entity, wherein the advertisement comprises a matching subject to the first subject and one of a sale offer or an incentive for the matching subject.

4. The method of claim 3, wherein the first sentiment is further communicated to the advertisement entity, and wherein the one of the sale offer or the incentive is further based on the first sentiment.

5. The method of claim 1, wherein the at least one second subject and the at least one second sentiment are determined using a second syntactic parse tree for the at least one sentence.

6. The method of claim 1, further comprising:
removing at least a first word from the search query based on the first subject;
removing at least a second word from the at least one sentence in the content based on the at least one second subject; and
normalizing the search query with the at least one sentence based on removing at least the first word and at least the second word.

7. The method of claim 1,
determining a first topicality group for the first subject;
determining at least one second topicality group for the at least one second subject; and
determining that the first topicality group matches or is associated with the at least one second topicality group,
wherein the generalization score is further based on determining that the first topicality group matches or is associated with the at least one second topicality group.

8. The method of claim 1, wherein the providing the search results comprises ranking the search results based on the generalization score between the search query and the at least one sentence.

9. The method of claim 2, wherein the determining the similarity comprises aligning phrases between the first syntactic information and the second syntactic information.

10. The method of claim 9, further comprising:
determining a generalization score between the search query and the search results using the phrases aligned between the first syntactic information and the second syntactic information.

11. The method of claim 10, wherein the search results are provided in a ranked format based on the generalization score.

12. The method of claim 2, wherein the user needs expression is associated with an interest of the user in the search query.

13. The method of claim 12, further comprising:
communicating the first syntactic information to an advertisement entity; and
receiving an advertisement from the advertisement entity, wherein the advertisement comprises one of a sale offer or an incentive associated with the user needs statement in the first syntactic information.

14. The method of claim 13, wherein the advertisement is determined by the advertisement entity by matching the one of the sale offer or the incentive to the user needs statement, and wherein the user needs statement comprises a positive polarity statement in the first syntactic information.

15. The method of claim 14, wherein the advertisement comprises a sentiment statement for the one of the sale offer or the incentive associated with the user needs statement in the first syntactic information.

16. The method of claim 2, further comprising:
    determining a first topicality group for the first syntactic information; and
    determining at least one second topicality group for the second syntactic information,
    wherein determining the similarity uses the first topicality group and the at least one second topicality group.

17. The method of claim 2, wherein the search results comprises at least one of a forum posting, a blog posting, or a user review.

18. A system comprising:
    a non-transitory memory; and
    one or more hardware processors coupled to the non-transitory memory and configured to read instructions from the non-transitory memory to cause the system to perform operations comprising:
        receiving a search query;
        converting the search query to first syntactic information comprising a user syntactic parse tree for the search query, wherein the user syntactic parse tree comprises units of at least one word generated from the search query based on syntactic properties of the units;
        determining a sentiment in the search query based on the user syntactic parse tree and the syntactic properties of the units;
        determining, based on the sentiment and the syntactic properties of the units, a user needs expression affected by the sentiment in the search query;
        determining a subject of the search query based on the user needs expression;
        determining search results through an online search engine server using the subject and the sentiment in the first syntactic information;
        generating second syntactic information based on the search results;
        determining a similarity between the first syntactic information and the second syntactic information; and
        providing search results to the search query based on the similarity between the first syntactic information and the second syntactic information.

19. The system of claim 18, wherein the determining the similarity comprises aligning phrases between the first syntactic information and the second syntactic information, and wherein the operations further comprise:
    determining a generalization score between the search query and the search results using the phrases aligned between the first syntactic information and the second syntactic information,
    wherein the search results are provided in a ranked format based on the generalization score.

20. The method of claim 2, further comprising:
    determining a feature affecting the subject in the user needs expression,
    wherein the search results are further determined using the feature.

* * * * *

UNITED STATES PATENT AND TRADEMARK OFFICE
CERTIFICATE OF CORRECTION

PATENT NO. : 10,402,411 B2  
APPLICATION NO. : 15/150292  
DATED : September 3, 2019  
INVENTOR(S) : Boris A. Galitsky Page 1 of 1

It is certified that error appears in the above-identified patent and that said Letters Patent is hereby corrected as shown below:

In the Specification

In Column 3, Line 62, change "APPLES" to --APPLE®--

Signed and Sealed this  
Twenty-ninth Day of October, 2019

Andrei Iancu  
*Director of the United States Patent and Trademark Office*